United States Patent
Gail et al.

(10) Patent No.: US 9,471,793 B2
(45) Date of Patent: Oct. 18, 2016

(54) SYSTEM ON CHIP WITH EMBEDDED SECURITY MODULE

(71) Applicant: Infineon Technologies AG, Neubiberg (DE)

(72) Inventors: Markus Gail, Munich (DE); Gerd Dirscherl, Munich (DE); Marcus Janke, Munich (DE)

(73) Assignee: Infineon Technologies AG, Neubiberg (DE)

( * ) Notice: Subject to any disclaimer, the term of this patent is extended or adjusted under 35 U.S.C. 154(b) by 130 days.

(21) Appl. No.: 14/137,065

(22) Filed: Dec. 20, 2013

(65) Prior Publication Data

US 2014/0223569 A1    Aug. 7, 2014

Related U.S. Application Data

(60) Provisional application No. 61/749,632, filed on Jan. 7, 2013.

(51) Int. Cl.
| | |
|---|---|
| *G06F 7/04* | (2006.01) |
| *G06F 21/60* | (2013.01) |
| *G06F 21/00* | (2013.01) |
| *G06F 21/71* | (2013.01) |

(52) U.S. Cl.
CPC .............. *G06F 21/60* (2013.01); *G06F 21/00* (2013.01); *G06F 21/71* (2013.01); *G06F 2221/2121* (2013.01)

(58) Field of Classification Search
CPC ........ G06F 21/60; G06F 21/71; G06F 21/00; G06F 2221/2121
USPC .......................................................... 726/26
See application file for complete search history.

(56) References Cited

U.S. PATENT DOCUMENTS

| | | | |
|---|---|---|---|
| 2006/0005072 A1* | 1/2006 | Philippe Conti et al. ........ | 714/5 |
| 2006/0015947 A1* | 1/2006 | Conti et al. ..................... | 726/34 |

(Continued)

FOREIGN PATENT DOCUMENTS

| | | |
|---|---|---|
| EP | 2372538 A1 | 10/2011 |
| WO | 2012123400 A1 | 9/2012 |

OTHER PUBLICATIONS

"System on a Chip," In: Wikipedia, Die freie Enzyklopädie, Bearbeitungsstand: Jan. 2, 2013, https://de.wikipedia.org/wiki/System-on-a-chip?oldid=112411290, Retrieved on Sep. 7, 2016, pp. 1-7. English version also attached herewith.

*Primary Examiner* — Mohammad W Reza
(74) *Attorney, Agent, or Firm* — Murphy, Bilak & Homiller, PLLC

(57) ABSTRACT

An embedded security module includes a security processor, volatile and non-volatile memory, and an interface. The security processor includes transistors formed in one or more semiconductor layers of a semiconductor die, and implements one or more security-related functions on data and/or code accessed by the security processor. The volatile memory is fabricated on the same semiconductor die as the security processor and stores the data and/or code accessed by the security processor. The non-volatile memory includes non-volatile storage cells disposed above each semiconductor layer of the semiconductor die, and securely stores at least one of the data and/or code accessed by the security processor and security information relating to the data and/or code accessed by the security processor. The interface is fabricated on the same semiconductor die as the security processor and provides a communication interface for the security processor.

19 Claims, 3 Drawing Sheets

(56) References Cited

U.S. PATENT DOCUMENTS

| | | |
|---|---|---|
| 2007/0150756 A1 | 6/2007 | Kudelski |
| 2009/0194768 A1 | 8/2009 | Leedy |
| 2012/0320517 A1* | 12/2012 | Berner et al. ............ 361/679.31 |
| 2013/0212671 A1* | 8/2013 | Wang ...................... G06F 21/70 726/16 |
| 2014/0376306 A1* | 12/2014 | Bedeschi ........... G11C 13/0004 365/163 |

* cited by examiner

SYSTEM ON CHIP WITH EMBEDDED SECURITY MODULE

PRIORITY CLAIM

This application claims priority to U.S. Provisional Application No. 61/749,632 filed on 7 Jan. 2013, said provisional application incorporated herein by reference in its entirety.

TECHNICAL FIELD

The instant application relates to system-on-chip (SOC) designs, and more particularly embedded security modules for SOC designs.

BACKGROUND

Embedded Security Module (ESM) architectures require a non-volatile memory for protecting against manipulation and observation e.g. by storing keys for encryption and authentication, certificates, signatures, code (secure operating system and security applications), etc. External memories cannot fulfill the above requirements, especially with respect to replay attacks and chip individual encryption. Usually, certifiable high-end security products therefore implement embedded NVM (non-volatile memory) technologies, e.g. Flash, EEPROM, etc. The embedding of these embedded NVM technologies causes major changes to the underlying logic process and is consequently quite expensive.

SUMMARY

According to an embodiment of an embedded security module (ESM), the ESM comprises a security processor, volatile and non-volatile memory, and an interface. The security processor includes transistors formed in one or more semiconductor layers of a semiconductor die, and is operable to implement one or more security-related functions on data and/or code accessed by the security processor. The volatile memory is fabricated on the same semiconductor die as the security processor and is operable to store the data and/or code accessed by the security processor. The non-volatile memory includes non-volatile storage cells disposed above each semiconductor layer of the semiconductor die, and is operable to securely store at least one of the data and/or code accessed by the security processor and security information relating to the data and/or code accessed by the security processor. The interface is fabricated on the same semiconductor die as the security processor and is operable to provide a communication interface for the security processor.

According to an embodiment of a system on a chip (SOC) integrated on a semiconductor die, the semiconductor die comprises a system bus, one or more processing cores coupled to the system bus, memory coupled to the system bus and accessible by the one or more processing cores, and an embedded security module (ESM). The ESM comprises a security processor comprising transistors formed in one or more semiconductor layers of the semiconductor die, the security processor operable to implement one or more security-related functions on data and/or code accessed by the security processor. The ESM further comprises volatile memory operable to store the data and/or code accessed by the security processor and non-volatile memory comprising non-volatile storage cells disposed above each semiconductor layer of the semiconductor die. The non-volatile memory is operable to securely store at least one of the data and/or code accessed by the security processor and security information relating to the data and/or code accessed by the security processor. The ESM also comprises an interface operable to provide a communication interface between the security processor and the one or more processing cores.

According to another embodiment of a SOC, the SOC comprises an ESM and one or more processor cores integrated on the same semiconductor die. The ESM comprises a security processor, an interface for communication with the one or more processor cores and a magnetoresistive random-access memory or a phase-change random-access memory embedded in the embedded security module.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

According to embodiments described herein, an embedded security module (ESM) is provided for integration in an SOC (system on a chip) design. The ESM includes embedded non-volatile memory for protecting against manipulation and observation e.g. by storing keys for encryption and authentication, certificates, signatures, code, etc. The embedded non-volatile memory comprises non-volatile storage cells disposed above each semiconductor layer of the semiconductor die in which the ESM is integrated, allowing for easy integration of the embedded non-volatile memory with the underlying logic technology used to fabricate the transistor devices of the SOC design.

Figure 1:
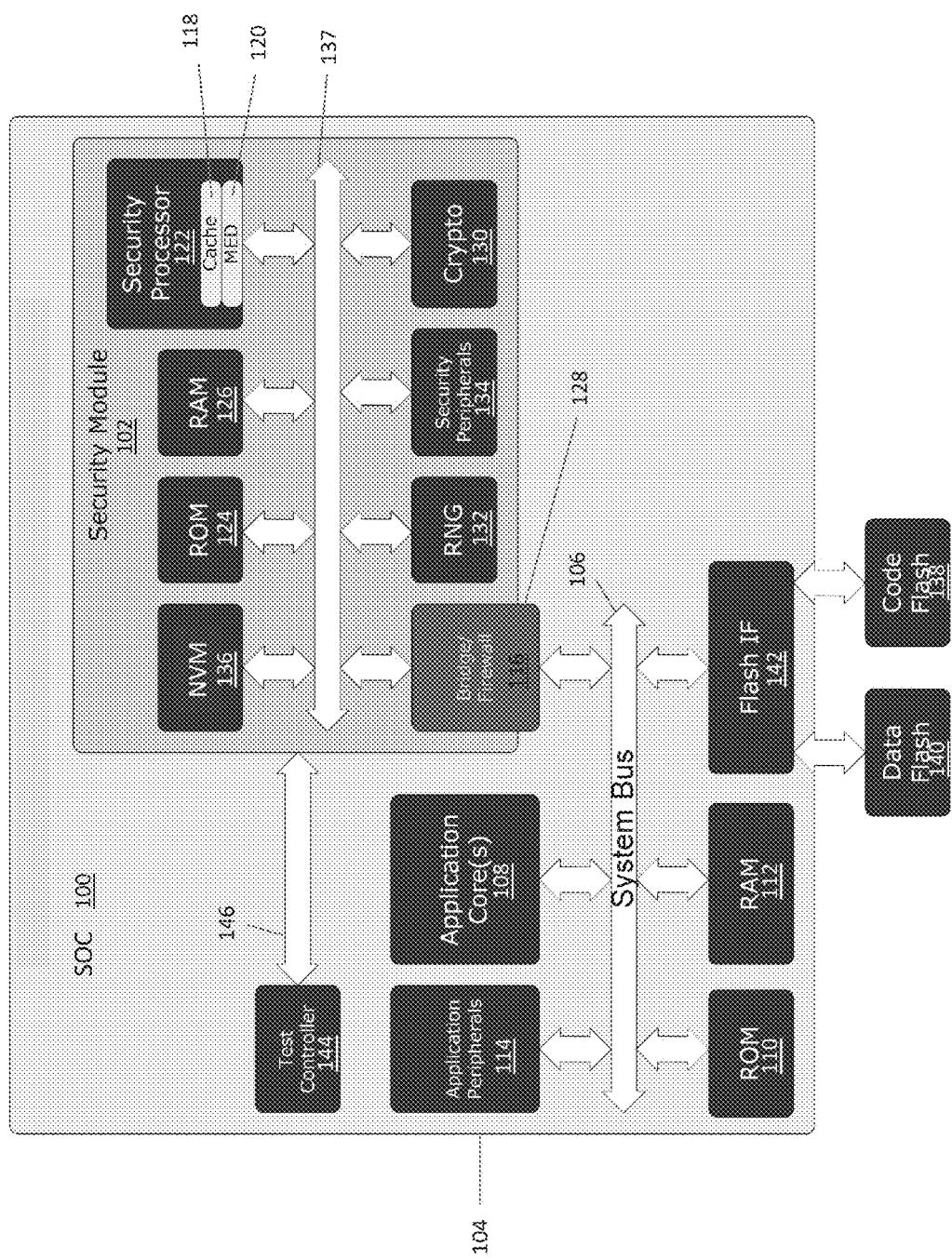
FIG. 1 illustrates a block diagram of an embodiment of a system on a chip (SOC) including an embedded security module (ESM) and other data processing resources integrated on the same semiconductor die.

FIG. 1 illustrates an embodiment of a system on a chip (SOC) 100 including an embedded security module (ESM) 102 and other data processing resources integrated on the same semiconductor die 104. The integration of different logic components such as a security module 102 and other data processing resources on the same die 104 is well known in the semiconductor arts, and therefore no further explanation is given in this regard. The SOC 100 includes a system bus 106, one or more processing cores 108 such as embedded processor cores coupled to the system bus 106, memory such as ROM (read only memory) 110 and RAM (random access memory) 112 coupled to the system bus 106 for storing program code and related data. The SOC memory 110, 112 is accessible by the one or more processing cores 108 via the system bus 106. The SOC 100 can also include peripherals 114 such as accelerators, counter-timers, real-time timers, power-on reset generators, etc.

The ESM 102 integrated on the same die 104 as the other data processing resources can be based on a hardware design e.g. a processor, ASIC (application-specific integrated-circuit) or the like. Various software stacks can run on the ESM 102 such as Javacard 3.x and/or Global Platform 2.2 stack. The ESM 102 can be designed to run third party payment, access and/or loyalty applications. The ESM 102 can be embedded into existing platforms, for example based on 28 nm logic process using MRAM embedded memory technology.

The ESM 102 is integrated with the other data processing resources on the same die 104 to better isolate the ESM 102 for security reasons. Communication between an application and the ESM 102 can be facilitated via a bride/firewall 116 according to this embodiment, to ensure optimal security. The ESM 102 can also have an internal cache 118 and memory encryption/decryption logic 120 for encrypting and decrypting internal memory. A hardware design of the ESM 102 can be fully based on digital and software protection mechanisms, in order to ease migration e.g. to 28 nm or finer technologies. Encryption accelerators such as 3DES, RSA and AES can be employed.

Figure 3:
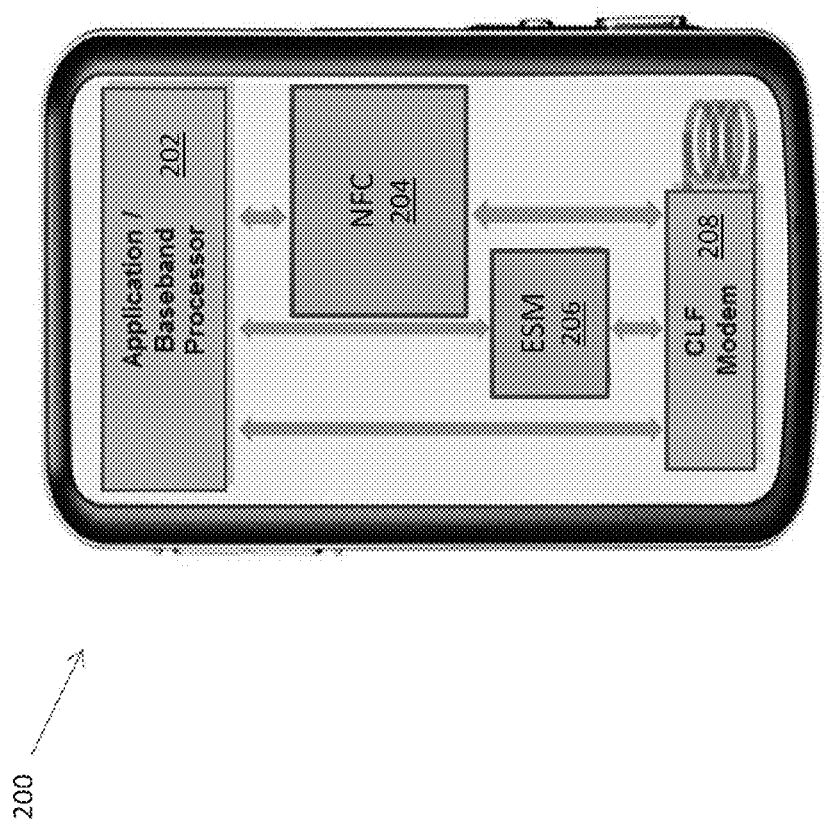
FIG. 3 illustrates a block diagram of a mobile wireless device that could be modified to include the SOC of FIG. 1 or 2.

In general, the ESM 102 also includes a security processor 122 comprising transistors formed in one or more semiconductor layers of the semiconductor die 104. The internal transistor device structure of a security processor 122 depends on the semiconductor technology deployed and is well known, and therefore no further explanation is given in this regard. The security processor 122 implements one or more security-related functions on data and/or code (e.g. secure operating system and security applications code and related data) accessed by the security processor 122. For example, the ESM 102 can perform security tasks for applications running on one or more of the processing cores 108. The ESM 102 can also run security applications independently of the applications running on the processing cores 108 of the SOC 100. FIG. 3 is an example of this, where the ESM 102 can run NFC (near filed communication applications) which uses the CLF (or near field communication) modem for communication without interaction with the application/baseband processor.

The ESM 102 further includes volatile memory fabricated on the same semiconductor die 104 as the security processor 122 and stores the data and/or code accessed by the security processor 122. For example, ROM (read only memory) 124 can be provided for storing boot code and RAM (random access memory) 126 can be provided for storing application code and related application data. An interface 128 fabricated on the same semiconductor die 104 as the security processor 122 provides a communication interface between the security processor 122 and the one or more processing cores 108 of the SOC 100. The interface 128 can provide a connection to the one or more processing cores 108 via the system bus 106, by direct coupling to the one or more processing cores 108, etc. The ESM 102 also contains all necessary security functions such as co-processors 130 for cryptographic operations, random number generators (RNG) 132, security peripherals 134 such as encryption units and hashing units, etc.

The ESM 102 also includes non-volatile memory (NVM) 136 comprising non-volatile storage cells disposed above each semiconductor layer of the semiconductor die 104. The non-volatile memory 136 securely stores at least one of the data and/or code accessed by the security processor 122 and security information relating to the data and/or code accessed by the security processor 122. The cells of the non-volatile memory 136 can contain non-metal elements.

Also transistors can be below the non-volatile memory storage cells in the one or more semiconductor layers of the semiconductor die 104 to access and control read/write operations of the non-volatile memory storage cells.

In one embodiment, the non-volatile memory 136 is a magnetoresistive random-access memory (MRAM) embedded in the ESM 102 and comprising magnetic storage cells disposed above each semiconductor layer of the semiconductor die 104. The embedded MRAM is robust against magnetic fields, high temperature, etc. In another embodiment, the non-volatile memory 136 is a phase-change random-access memory (PCRAM) embedded in the ESM 102 and comprising chalcogenide storage cells disposed above each semiconductor layer of the semiconductor die 104.

MRAM and PCRAM technologies enable non-volatile memory storage in post-processed layers e.g. one or more metal layers above each semiconductor layer of a die 104, which are easier to integrate with logic technology as compared to Flash and EEPROM. The cell construction and layout of MRAM and PCRAM devices is well known, and therefore no further explanation is given in this regard. Using MRAM/PCRAM as the embedded storage for security related code and data allows high-end security functions to be realized on complex logic SOCs e.g. such as TPM (trusted platform module), NFC enabled handset processor with secure element, set-top-box SOC, etc. In each case, the non-volatile memory 136 of the ESM 102 can be directly accessible only by the ESM 102 to further enhance system security. The security processor 122 can access the internal non-volatile memory 136 by an internal bus 137.

In one embodiment, the capacity of the non-volatile memory 136 is sufficient to store the security information relating to the data and/or code accessed by the security processor 122, but not all of the data and code accessed by the security processor 122. In this case, large amounts of code and data can be stored in external Flash memories 138, 140 to lower the overall SOC cost. The SOC design can include an interface 142 such as a standard Flash interface integrated on the same die 104 as the other data processing resources and ESM 102, for enabling communication between the components of the SOC and the external Flash memories 138, 140. The non-volatile memory 136 of the ESM 102 is then mainly used to store the root keys (e.g. for encryption of the external memories), signatures (e.g. for protection of the integrity of the external memory content) and boot code, in order to encrypt and protect the content of the external memories 138, 140. The interface 128 of the ESM 102 can be a standard high bandwidth communication bridge 116 to ensure timely access to the data and code stored in external Flash memories 138, 140. The bridge 116 can include a standard firewall for restricting access to the ESM 102. The firewall can implement any standard protocol for protecting the internal components of the ESM 102 against access from outside the ESM 102.

In general, the security information stored in the non-volatile memory 136 of the ESM 102 can include at least one of keys for encrypting the data and code accessed by the security processor 122, keys for authenticating access to the ESM 102, certificates, signatures, boot code, and time stamps for counteracting replay attacks on the external memories 138, 140 used to store the data and code accessed by the security processor 122. The SOC design can include a test controller 144 and corresponding test bus 146 for accessing and testing the ESM 102.

Figure 2:
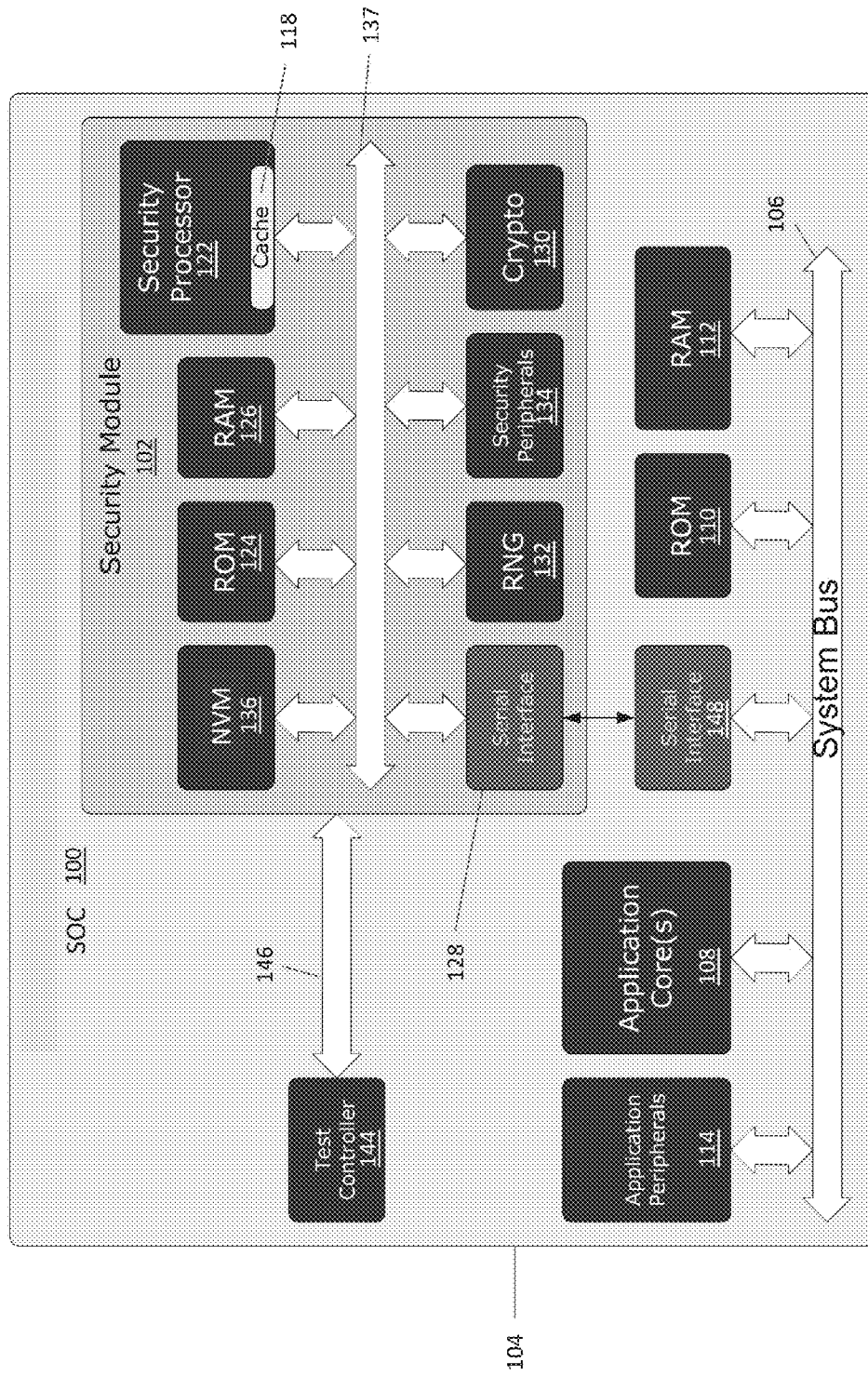
FIG. 2 illustrates a block diagram of another embodiment of an SOC including an ESM and other data processing resources integrated on the same semiconductor die.

FIG. 2 illustrates another embodiment of an SOC design where the capacity of the non-volatile memory 136 of the ESM 102 is sufficient to store all of the data and code accessed by the security processor so that external memories such as external Flash drives are not needed. In this case, the interfaces 128, 148 between the ESM 102 and the system bus 106 of the SOC 100 can each be a standard serial interface because the data and code accessed by the security processor 122 are stored completely within the non-volatile memory 136 of the ESM 102. For example, embedded MRAM can be used for the ESM code and data storage. In one embodiment, the embedded MRAM 136 has a minimum capacity of 500 kilobytes for code and data storage. In general the capacity of the non-volatile memory 136 of the ESM 102 can range between 100 kilobytes and 1.5 megabytes, for example.

The ESM-based SOC systems described herein can implement 3DES (a mode of the DES encryption algorithm), RSA (an algorithm for public-key encryption) and/or AES (a specification for the encryption of electronic data established by the U.S. National Institute of Standards and Technology) encryption technologies. The ESM-based SOC systems described herein can also be deployed in various systems such as mobile wireless devices, TPMs, set-top-boxes, etc.

FIG. 3 for example illustrates an exemplary conventional mobile wireless device 200 including an application/baseband processor 202, an authentication/NFC (near field communication) applications and services module or chip 204, a separate ESM die 206 that runs security and NFC applications and a CLF (or near field communication) modem 208. The baseband processor 202 of the mobile wireless device 200 could be replaced with the SOC 100 described herein so that the baseband processor, authentication and ESM functions are integrated on the same semiconductor die, with the integrated ESM including non-volatile storage cells disposed above each semiconductor layer of the semiconductor die also as previously described herein.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An embedded security module, comprising:
   a security processor included in a system on a chip (SOC) and comprising transistors formed in one or more semiconductor layers of a semiconductor die, the security processor operable to implement one or more security-related functions on data and/or code accessed by the security processor;
   volatile memory fabricated on the same semiconductor die as the security processor and operable to store the data and/or code accessed by the security processor;
   non-volatile memory comprising non-volatile storage cells disposed above each semiconductor layer of the semiconductor die, the non-volatile memory operable to securely store at least one of the data and/or code accessed by the security processor and security information relating to the data and/or code accessed by the security processor; and
   an interface fabricated on the same semiconductor die as the security processor and operable to provide a communication interface between the security processor and each processing core of the SOC.

2. The embedded security module of claim 1, wherein the non-volatile memory is a magnetoresistive random-access memory comprising magnetic storage cells disposed above each semiconductor layer of the semiconductor die.

3. The embedded security module of claim 1, wherein the non-volatile memory is a phase-change random-access memory comprising chalcogenide storage cells disposed above each semiconductor layer of the semiconductor die.

4. The embedded security module of claim 1, wherein the capacity of the non-volatile memory is sufficient to store the data and code accessed by the security processor.

5. The embedded security module of claim 4, wherein the interface is a serial interface.

6. The embedded security module of claim 1, wherein the capacity of the non-volatile memory is sufficient to store the security information relating to the data and/or code accessed by the security processor, but not all of the data and code accessed by the security processor.

7. The embedded security module of claim 6, wherein the security information stored by the non-volatile memory comprises at least one of keys for encrypting the data and code accessed by the security processor, keys for authenticating access to the embedded security module, certificates, signatures, boot code, and time stamps for counteracting replay attacks on external memories used to store the data and code accessed by the security processor.

8. The embedded security module of claim 6, wherein the interface is a communication bridge.

9. The embedded security module of claim 1, wherein the capacity of the non-volatile memory is between 100 kilobytes and 1.5 megabytes.

10. A system on a chip integrated on a semiconductor die, the semiconductor die comprising:
    a system bus;
    one or more processing cores coupled to the system bus;
    memory coupled to the system bus and accessible by the one or more processing cores; and
    an embedded security module, comprising:
      a security processor comprising transistors formed in one or more semiconductor layers of the semiconductor die, the security processor operable to implement one or more security-related functions on data and/or code accessed by the security processor;
      volatile memory operable to store the data and/or code accessed by the security processor;
      non-volatile memory comprising non-volatile storage cells disposed above each semiconductor layer of the semiconductor die, the non-volatile memory operable to securely store at least one of the data and/or code accessed by the security processor and security information relating to the data and/or code accessed by the security processor; and
      an interface operable to provide a communication interface between the security processor and the one or more processing cores.

11. The system on a chip of claim 10, wherein the non-volatile memory is a magnetoresistive random-access memory comprising magnetic storage cells disposed above each semiconductor layer of the semiconductor die.

12. The system on a chip of claim 10, wherein the non-volatile memory is a phase-change random-access memory comprising chalcogenide storage cells disposed above each semiconductor layer of the semiconductor die.

13. The system on a chip of claim 10, wherein the capacity of the non-volatile memory is sufficient to store the data and code accessed by the security processor.

14. The system on a chip of claim 13, wherein the interface is a serial interface.

15. The system on a chip of claim 13, further comprising an interface operable to provide a communication interface between the system bus and one or more memories external to the system on a chip and which store the data and code accessed by the security processor.

16. The system on a chip of claim 10, wherein the capacity of the non-volatile memory is sufficient to store the security information relating to the data and/or code accessed by the security processor, but not all of the data and code accessed by the security processor.

17. The system on a chip of claim 16, wherein the security information stored by the non-volatile memory comprises at least one of keys for encrypting the data and code accessed by the security processor, keys for authenticating access to the system on a chip, certificates, signatures, boot code, and time stamps for counteracting replay attacks on external memories used to store the data and code accessed by the security processor.

18. The system on a chip of claim 16, wherein the interface is a communication bridge between the security processor and the system bus.

19. The system on a chip of claim 1, wherein the capacity of the non-volatile memory is between 100 kilobytes and 1.5 megabytes.

* * * * *